(12) United States Patent
Acher et al.

(10) Patent No.: US 10,565,428 B2
(45) Date of Patent: Feb. 18, 2020

(54) MICRO-LOCALISATION METHOD AND DEVICE FOR AN IMAGING INSTRUMENT AND A MEASURING APPARATUS

(71) Applicant: HORIBA FRANCE SAS, Longjumeau (FR)

(72) Inventors: Olivier Acher, Gif sur Yvette (FR); Simon Richard, Palaiseau (FR); Melanie Gaillet, Cheptainville (FR); Alexander Podzorov, Orsay (FR); Adrian Knowles, Middlesex (GB)

(73) Assignee: HORIBA FRANCE SAS, Longjumeau (FR)

( * ) Notice: Subject to any disclaimer, the term of this patent is extended or adjusted under 35 U.S.C. 154(b) by 0 days.

(21) Appl. No.: 16/301,615

(22) PCT Filed: May 15, 2017

(86) PCT No.: PCT/FR2017/051171
§ 371 (c)(1),
(2) Date: Nov. 14, 2018

(87) PCT Pub. No.: WO2017/198939
PCT Pub. Date: Nov. 23, 2017

(65) Prior Publication Data
US 2019/0122026 A1 Apr. 25, 2019

(30) Foreign Application Priority Data

May 17, 2016 (FR) ...................................... 16 54378

(51) Int. Cl.
*G06K 9/00* (2006.01)
*G01Q 30/04* (2010.01)
(Continued)

(52) U.S. Cl.
CPC .......... *G06K 9/00134* (2013.01); *G01Q 30/04* (2013.01); *G01Q 30/20* (2013.01); *H04N 5/23218* (2018.08)

(58) Field of Classification Search
CPC ........ A01N 37/22; A01N 37/26; A01N 37/34; A01N 37/46; C07C 255/00; C07D 307/42;
(Continued)

(56) References Cited

U.S. PATENT DOCUMENTS 7,630,628 B2 12/2009 Ogihara
9,736,389 B2 * 8/2017 Acher .................... G01Q 40/00
(Continued)

FOREIGN PATENT DOCUMENTS

FR 2993988 A1 1/2014

OTHER PUBLICATIONS

International Search Report, dated Sep. 12, 2018, from corresponding PCT/FR2017/051171 application.

*Primary Examiner* — Sath V Perungavoor
*Assistant Examiner* — Yong Joon Kwon
(74) *Attorney, Agent, or Firm* — Young & Thompson (57) ABSTRACT

Disclosed is a micro-localisation device defining a system of spatial coordinates for an imaging instrument. The micro-localisation device includes at least one first zone and a second zone, adjacent to each other, each zone extending spatially over an area of macroscopic size, each zone including an elementary cell or a tiling of a plurality of elementary cells extending over the respective area of the zone, each elementary cell of the first, respectively second, zone including an orientation pattern, a positioning pattern and a periodic spatial pattern, configured to be imaged by an imaging instrument and to determine a position and, respectively an
(Continued)

orientation of the imaging instrument in the system of spatial coordinates of the micro-localisation device.

20 Claims, 4 Drawing Sheets

(51) Int. Cl.
*G01Q 30/20* (2010.01)
*H04N 5/232* (2006.01)

(58) Field of Classification Search
CPC ........ G01Q 30/04; G01Q 30/20; G02B 21/26; G02B 21/34; G02B 21/365; G06K 9/00134; H04N 5/23218
See application file for complete search history.

(56) References Cited

U.S. PATENT DOCUMENTS

| | | |
|---|---|---|
| 2012/0133757 A1 | 5/2012 | Thomas et al. |
| 2012/0256007 A1 | 10/2012 | Cok |
| 2013/0077160 A1 | 3/2013 | Heise et al. |
| 2014/0049818 A1 | 2/2014 | Schlaudraff |
| 2015/0201117 A1* | 7/2015 | Acher ............... G01Q 40/00 348/79 |
| 2016/0124431 A1 | 5/2016 | Kelso et al. |

* cited by examiner

MICRO-LOCALISATION METHOD AND DEVICE FOR AN IMAGING INSTRUMENT AND A MEASURING APPARATUS

TECHNICAL FIELD OF THE INVENTION

The present invention relates to a spatial marking device and method for a system for characterising a sample.

It relates more specifically to a device for marking in position and in orientation for a microscope or metrology instrument making it possible to obtain a sub-micrometric or even nanometric positioning accuracy and repeatability on the sample.

Finally, it relates to method for marking a metrology or analysis instrument in position and in orientation.

BACKGROUND INFORMATION AND PRIOR ART

With the emergence of the nanotechnology era, the capacity to take extremely accurate measurements in order to control the production, operation and ageing of different components on a nanometric scale has become essential. Recurring problems are thus the re-localisation and co-localisation of measurements taken at different instants of time and/or with different measuring instruments. As an example, different types of measurements can be optical microscopy, Raman microscopy, electron microscopy measurements forming an image of the sample with a micrometric or sub-micrometric spatial resolution.

In the present document, by accuracy in position and/or in orientation, this means both the notion of absolute accuracy and repeatability.

By re-localisation of measurements, here this means the possibility of taking measurements in one same place of a sample at different instants in time, the sample possibly having undergone a certain physical, chemical or other treatment between a plurality of measurements. The re-localisation accuracy currently requested depends on the structure of the sample and on the spatial resolution of each type of measurement, but is situated generally in the micrometric, sub-micrometric or nanometric scale.

By co-localisation of measurements, here this means the possibility to take different measurements in one same place of a sample, each measurement giving complementary information with respect to the other measurements. For example, the different measurements can be based on a physical or chemical contrast and/or a different spatial resolution.

The re-localisation and the co-localisation of measurements firstly require a high spatial accuracy since here it is the accuracy of the positioning of an incident beam and/or a detection system with respect to the sample to take a localised measurement. The re-localisation and the co-localisation of measurements secondly require a high repeatability of measurements. Indeed, it is essential to be able to repeat a measurement under identical conditions and to obtain the same result on a stable sample. These conditions of accuracy and repeatability are essential to make it possible to transfer the sample to analyse it by different techniques.

The problems of re-localisation and co-localisation of measurements can be returned to those of a transfer of a system of reference coordinates to the system of coordinates of the measuring instrument. In this field, today there is a plurality of solutions.

A characterisation device is known, for example, from document U.S. Pat. No. 7,630,628, including a positioning system making it possible to position the measuring instrument with respect to the sample to characterise in one localised measuring point of the sample. The positioning system from document U.S. Pat. No. 7,630,628 includes, in particular, a sample stage on which the sample is placed, the controlling means making it possible to move this stage accurately and in a repeatable manner. This makes it possible, if the sample is secured to the sample stage, and if the sample is not handled between two measurements being taken, to take two measurements at two substantially identical measuring points. However, the positioning system from document U.S. Pat. No. 7,630,628 does not make it possible to know the position of the measuring instrument with respect to the sample, i.e. to absolutely position the measuring instrument with respect to the sample.

Patent document US 2013/0077160 A1 describes an alignment marking unit for a sample stage of an imaging microscope. The alignment marking unit includes one or more geometric or alphanumeric patterns, of different sizes, for example L-shaped. The pattern advantageously has a rotation asymmetry and natural perpendicular axes defining the orientation of a reference system of coordinates. To define the reference system of coordinates, the operator must position, manually or automatically, a pattern at a suitable scale according to the imaging system. This device requires an accurate and often laborious pre-positioning. The localisation accuracy is limited by the pixel size and by the resolution of the imaging and image processing system. In addition, the accuracy in angular orientation is limited, of around $\Delta\alpha \sim 10^{-2}$ radian. This angular accuracy limitation induces positioning errors according to the distance between the alignment mark and the sample: at a distance d~5 mm, the positioning error is proportional to d $\Delta\alpha$ ~50 microns, which is insufficient in applications on a microscopic scale.

Patent document US 2012/0133757 A1 describes a sample stage device that can be adapted on the translation stage of an optical microscope and of an electron microscope. The sample stage includes three alignment marks of geometric shape that are visible to the naked eye and remote from one another. The three alignment marks define a reference marker connected to the sample stage. An imaging system and an image processing system make it possible to recognise the position and the orientation of the alignment marks and to determine a system of reference coordinates. Zones of interest of the sample can be referenced in this system of reference coordinates and can be found later on the same instrument or on another instrument, while the sample remains secured to the sample stage supporting the alignment marks. However, this system requires an accurate manual pre-positioning to bring each alignment mark into the field of view of the imaging system. The smaller the alignment mark is with respect to the size of the sample, the more laborious the pre-positioning is. In addition, this system is limited to a restricted magnification range: if an alignment mark is suitable for a certain instrumental field of view, the instruments with a magnification which is too small cannot distinguish it, and the instruments with a magnification which is too large, cannot form a full image from it. Moreover, this system offers a localisation accuracy of around the pixel size of the imaging system. Indeed, during manual marking, the accuracy is conditioned by the action of the operator and does not exceed the size of a pixel. In the case of automatic marking, the patterns used make it possible to mark the position thereof with an accuracy of around one pixel. Furthermore, this system requires the use of at least three alignment marks separated spatially, the distance between the alignment marks determining the angular accuracy in each direction of the system of coordinates. This device is consequently bulky, as the three alignment marks are arranged far from the sample. Finally, this device can be sensitive to the thermal dilatation effects of the support which induce a positioning error and limit the accuracy of this device.

Finally, from patent document FR 2993988, an alignment sight secured to the rear face of a sample is known. An optical imaging system forms an image of the alignment sight. An image processing system provides from this image with the sight, the position and the orientation of the sample with respect to a measuring instrument, subject to calibration of the measuring instrument with respect to the imaging system. However, this alignment sight is not suitable for very different magnifications. Patent document FR 2993988 also discloses a multimodal and multiscale marker including a pattern of self-similar structure not having rotation symmetry, formed by a metal deposit on a glass slide. On the one hand, this marker has an optical contrast making it possible for it to be observed in optical microscopy at different magnifications and is therefore a multiscale marker. On the other hand, this marker has a topographical structure making it possible for it to be observed in electron microscopy which makes it multimodal. However, the accuracy of positioning and orientation of this multimodal and multiscale marker is fundamentally limited by the size of a pixel.

Document US 2016/124431 A1 describes a multiscale marking device including embedded markers. Document US 2014/049818 A1 describes a microscope slide including reference points arranged at predetermined places.

One of the aims of the invention is to propose a device and a method making it possible for co-localisable measurements on a nanometric scale for a great variety of measuring instruments in order to produce a multimodal characterisation of a sample, i.e. to analyse this sample on a nanometric scale by different techniques.

Another aim of the invention is to make it possible for re-localisable measurements in one same place of the sample with a sub-micrometric or nanometric accuracy to produce measurements at different instants of time or to produce a multiscale characterisation centred on the same place of the sample, for example via a microscope with different magnifications.

SUMMARY OF THE INVENTION

In order to overcome the abovementioned disadvantage of the state of the art, the present invention proposes a micro-localisation device for an imaging instrument, the micro-localisation device defining a system of spatial coordinates and being suitable to be secured to a sample or to a sample stage.

More specifically, a micro-localisation device according to the invention is proposed, including at least one first zone and one second zone, adjacent to each other, said first, respectively second, zone extending spatially over a first, respectively second, area of macroscopic size, said first, respectively second, zone with a predetermined position and a predetermined orientation in the system of spatial coordinates of the micro-localisation device, said first, respectively second, zone including an elementary cell or a tiling of a plurality of elementary cells extending over the first, respectively second, area of said first, respectively second, zone, each elementary cell of the first zone extending over a first elementary area, each elementary cell of the second zone extending over a second elementary area, different from the first elementary area, the first, respectively second, elementary area extending into a size range going from sub-micrometric to macroscopic, each elementary cell of the first zone including a first periodic spatial pattern associated with a first spatial period function of the first elementary area, and, respectively, each elementary cell of the second zone including a second periodic spatial pattern associated with a second spatial period, different from the first spatial period, function of the second elementary area, each elementary cell of said first zone, and respectively second zone, further including an orientation pattern and a positioning pattern in the system of spatial coordinates of the micro-localisation device, at least one of said first or second elementary cells being suitable such that said imaging instrument forms an image thereof, and deduces from it a position, respectively, an orientation of said image in the system of spatial coordinates of the micro-localisation device.

This micro-localisation device makes it possible to easily position the imaging instrument over the first zone and/or over the second zone, which are of macroscopic size, while providing an image of at least one elementary cell of the first zone and/or of the second zone. An image processing system makes it possible to analyse the image thus formed to deduce from it, on the one hand, the associated spatial period, and on the other hand, the position and the orientation of the cell imaged in the marker of the micro-localisation device. For this, all that is needed, is that the area of a cell is less than or equal to the object field of the imaging instrument and that the spatial period of the periodic pattern associated with the zone of the imaged cell is greater than the spatial resolution of the imaging instrument. The translation stage which makes it possible for the relative movement of the sample with respect to the imaging instrument can then be calibrated to make it possible to very accurately determine a measuring position on a sample secured to the micro-localisation device. This micro-localisation device makes it possible to easily determine the coordinates of the imaging instrument in the marker of the micro-localisation device, and thus to localise a measuring position on a sample with a micrometric, sub-micrometric or even nanometric accuracy and repeatability.

Other non-limiting and advantageous characteristics of the micro-localisation device that conforms with the invention, taken individually or according to all technically possible combinations, are as follows:

the area of the first zone is equal to the area of the second zone;

the first spatial period is greater than or equal to double the second spatial period, or to a multiple of the second spatial period;

the first periodic spatial pattern covers at least fifty percent of the area of each elementary cell of the first zone, and/or, respectively, the second periodic spatial pattern covers at least fifty percent of the area of each elementary cell of the second zone;

each elementary cell further includes an identification pattern;

the first periodic spatial pattern is periodic along two transverse directions with the same first spatial period and/or the second periodic spatial pattern is periodic along said two transverse directions with the same second spatial period;

the micro-localisation device further includes at least one other spatial uniform zone over the whole of the area thereof;

the orientation pattern, the positioning pattern and the periodic spatial pattern are formed by depositing and/or engraving a thin, metal layer;

each elementary cell is of polygonal shape, preferably square, with sides of length equal to a whole number multiple between one unit and few tens of the spatial period of the periodic spatial pattern of said elementary cell;

the micro-localisation device includes at least one zone separated from the first zone, each elementary cell of the separated zone including the same first periodic spatial pattern associated with the same first spatial period and each elementary cell of the separated zone extending over an elementary area function of the first spatial period;

the micro-localisation device includes a plurality of zones arranged so as to form a micro-localisation device of asymmetrical shape on a macroscopic scale;

the micro-localisation device includes a plurality of zones, each zone of the plurality of zones extending spatially over an area of macroscopic size, each zone of the plurality of zones including an elementary cell or a tiling of a plurality of elementary cells extending over the respective area of said zone, the zones of said plurality of being arranged around a junction point common to an elementary cell of each of said zones, each elementary cell of each of said zones around the junction point being associated one-to-one, on the one hand, with an elementary area and, on the other hand, with a periodic spatial pattern function of the elementary area of said zone.

The invention also proposes a sample stage for microscopy apparatus including at least one micro-localisation device according to one of the embodiments.

The invention also proposes a measuring apparatus including an imaging instrument, a sample stage, a control unit and at least one micro-localisation device, the micro-localisation device being secured to a sample or to a sample stage, the imaging instrument being configured to acquire an image, for example a microscopy image of a sample, the control unit being configured to provide coordinates of said image in the system of coordinates of the micro-localisation device.

In a specific embodiment, the measuring apparatus further includes a system for moving the sample stage integrating a measuring device for moving the sample stage in a system of coordinates of this movement system, the control unit being configured to control a movement of the sample stage in the system of coordinates of the micro-localisation device. Preferably, the microscopy apparatus includes a stage for moving in translation, along one, two or three transverse directions, the movement stage including at least one micro-localisation device.

In another specific embodiment, the measuring apparatus includes a device for scanning an incident beam with respect to a sample, the control unit is configured to control a movement by scanning the incident beam, and the control unit includes a system for processing the signal, suitable for reconstructing an image, point-by-point, according to the scanning of the beam in the system of coordinates of the micro-localisation device. For example, the system for scanning the beam is suitable for scanning a photon beam or a particle beam along one or two transverse directions with respect to the sample.

In another specific embodiment, the measuring apparatus includes a scanning probe microscopy apparatus with a tip and a system for moving said tip relatively to a sample to be analysed, and the control unit includes a system for processing the signal, suitable for reconstructing an image, point-by-point, according to the scanning movement the scanning probe in the system of coordinates of the micro-localisation device.

The invention also relates to a method for micro-localising a sample including the following steps:

securing a micro-localisation device with a sample stage or a sample to be analysed so as to define a system of spatial coordinates connected to said sample, arranging an imaging instrument so as to form an image of at least one elementary cell of the micro-localisation device, processing said image of at least one elementary cell of a zone to extract from it, on the one hand, an orientation and a position of the elementary cell in the marker of the micro-localisation device, and, on the other hand, a spatial period associated with the zone of the micro-localisation device to deduce from it, an orientation and a position of said image in the system of spatial coordinates of the micro-localisation device.

DETAILED DESCRIPTION OF AN EXAMPLE OF AN EMBODIMENT

The following description regarding the appended drawings, given as non-limiting examples, will make understood what the invention consists of, and how it can be achieved.

In the appended drawings:

FIG. 5 schematically represents a macroscopic view of another micro-localisation device including four micro-localisation zones and a macroscopic mark;

FIG. 6 schematically represents, as a side view, an imaging instrument in measuring position facing a micro-localisation device (FIG. 6A) and, respectively, facing a sample (FIG. 6B);

FIG. 7 schematically represents, as a top view, a microscopy apparatus equipped with a micro-localisation device according to an embodiment;

FIG. 8 schematically represents an enlarged view of an image of a junction between four different zones of a micro-localisation device;

DEVICE

In the present document, the terms, reference point, marker or system of coordinates are used equally. Such a marker includes at least one spatial reference position and at least one spatial size, and preferably two spatial sizes or even three spatial sizes. The marker is preferably orthonormal.

Figures 1, 2, 3, 4A, 4B:
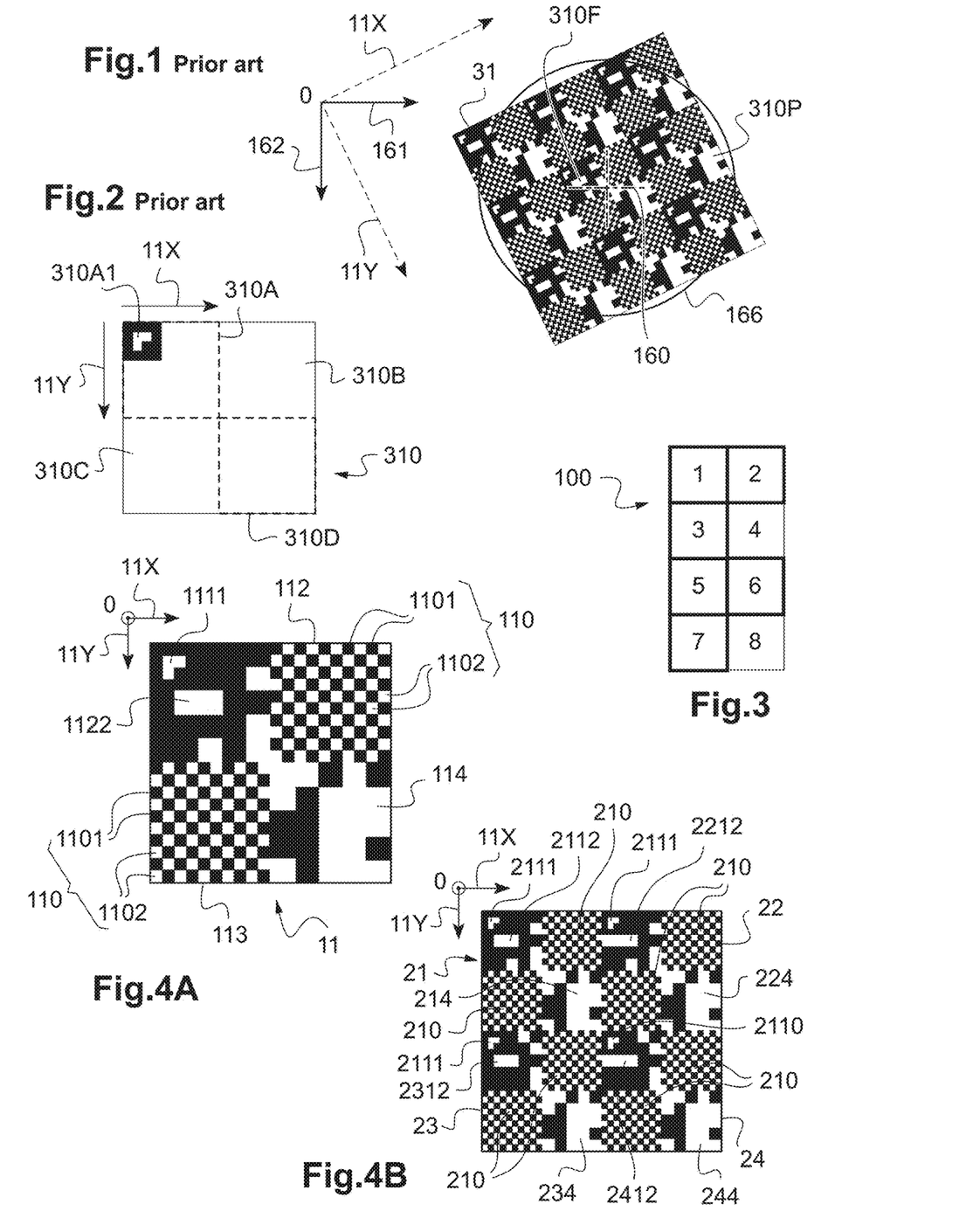
FIG. 1 represents an image of a part of a localisation sight according to the prior art.
FIG. 2 represents a schematic view of a localisation sight elementary cell illustrating a coding of identification, orientation and position patterns.
FIG. 3 schematically represents a macroscopic view of a micro-localisation device composed of a plurality of zones according to an embodiment.
FIG. 4A represents a schematic view of an example of a first zone of a micro-localisation device, this first zone including one single elementary cell.
FIG. 4B represents a schematic view of an example of a second zone of a micro-localisation device, this second zone including a tiling of four elementary cells.

In FIG. 1, an image of a part of a localisation sight 31 according to the prior art and, in superposition, a central part of the field of view of an imaging instrument arranged to form an image of this localisation sight 31 have been represented.

This localisation sight 31 includes a support and at least one layer including micro-structured patterns. This localisation sight 31 is configured to be fixed on a flat face of a sample. Advantageously, the layer including patterns has a suitable optical contrast to be imaged by an optical imaging system with a suitable magnification and a suitable resolution to form an image of the micro-structured patterns. Particularly advantageously, the calibration sight 31 is produced by a metal deposit on a glass slide, giving it, on the one hand, a sufficient optical contrast to be observed by optical microscopy with different magnifications and by electron microscopy, and, on the other hand, a topographic structure that can be observed by means of an atomic force microscope.

FIG. 1 represents a marker formed of a point O and the orthogonal axes 11X and 11Y. This orthonormal marker (O, 11X, 11Y) forms a system of coordinates connected to the localisation sight 31. FIG. 1 represents another marker formed of a cross centred on a point 160 and the orthogonal axes 161 and 162. This marker (160, 161, 162) forms a system of coordinates connected to the imaging instrument. In an example of an embodiment, the imaging instrument includes a matrix of detectors, or matrix of pixels, and an optical system for forming images, optically conjugating the localisation sight with the matrix of detectors. The circle 166 schematically represents the field of view of the imaging instrument, the point 160 being on the axis of the optical system for forming images. A calibration based on the detection of the image of a part of the sight, makes it possible to determine the formula for transferring coordinates between the system of coordinates (O, 11X, 11Y) connected to the localisation sight 31 and the system of coordinates (160, 161, 162) connected to the imaging instrument.

More specifically, the calibration sight 31 includes a plurality of elementary cells forming a regular two-dimensional tiling.

Each elementary cell 310 includes a positioning pattern, indicating the position of said elementary cell in the marker (O, 11X, 11Y) of the localisation sight 31 and an orientation pattern, indicating the orientation of said elementary cell in the marker (O, 11X, 11Y) of the localisation sight 31. In addition, each elementary cell 310 includes at least one periodic pattern, illustrated in the form of a black and white check pattern in FIG. 1, making it possible to improve the accuracy of the positioning of the imaging instrument with respect to the marker (O, 11X, 11Y). Particularly advantageously, each elementary cell 310 includes a coding identification pattern for information relating to the localisation sight and/or the sample to be analysed.

FIG. 2 schematically represents an example of a structure of an elementary cell 310. The elementary cell 310 here includes four separate sub-cells 310A (sub-cell at the top-left of the elementary cell 310), 310B (at the top-right), 310C (at the bottom-left), and 310D (at the bottom-right). Each sub-cell 310A, 310B, 310C, 310D here is square and has an edge of around 100 microns. The sub-cell 310A includes an orientation pattern 310A1, of which the orientation is predetermined with respect to the axes 11X, 11Y of the localisation sight 31. Here, the orientation pattern 310A1 is L-shaped, each branch of the L being parallel to the axis 11X or 11Y. Moreover, it is observed in FIG. 1, that each elementary cell here includes an identical orientation pattern, of the same shape and of the same size, arranged and oriented in the same manner in each elementary cell with respect to the marker (O, 11X, 11Y). The remainder of the sub-cell 310A here forms a two-dimensional pattern, coding the positioning specific to each elementary cell and determining the position of this elementary cell in the marker (O, 11X, 11Y) of the localisation sight 31.

Each elementary cell 310 includes at least one periodic pattern. In the example illustrated in FIG. 2, all the elementary cells each include two sub-cells 310B and 310C with one same periodic pattern. This periodic pattern is constituted of a check pattern of black and white squares, including at least two lines and two columns. In the example represented, each check pattern includes ten lines and ten columns of ten squares, alternatively black and white, that is a total of 100 squares. All the squares are of the same size over the whole area of the localisation sight. In this example, each square of the check pattern has a side of length equal to around 10 microns.

This periodic pattern makes it possible to improve the accuracy of the positioning of the imaging system with respect to the localisation sight 31.

Each elementary cell 310 includes a sub-cell 310D which is a two-dimensional pattern, coding an identification of the cell 310. Advantageously, the identification pattern of the sub-cells 310D is identical for each of the elementary cells 310 of the localisation sight 31, such that it codes, each time, for the same information relating to the sample and/or to the localisation sight 31, for example the reference of the sample and the size of a square of the periodic pattern of the sub-cell 310B or 310C. In a variant, the identification pattern can, for example, code a reference of the localisation sight, a scale of the elementary cell, a code making it possible to correctly interpret the localisation information of the localisation sight. In a variant also, the identification pattern can also be different for each of the elementary cells of the localisation sight.

The imaging instrument includes means for acquiring and processing images. The imaging instrument is arranged and configured so as to capture an image of a part of the localisation sight 31. More specifically, the imaging instrument is configured to form an image 310P of one or more elementary cells 310 of the localisation sight 31.

In particular in FIG. 1, the imaging instrument is arranged advantageously such that the image of the part of the localisation sight 31 includes a full image of a central elementary cell 310F including:

- an image of the positioning pattern and of the orientation pattern of this elementary cell 310F,
- an image of the periodic pattern of this elementary cell 310F, and
- an image of the identification pattern of this elementary cell 310F.

The imaging instrument acquires an image of at least one part of the localisation sight 31, this image being advantageously formed in the plane of a matrix of detectors. With the object field of the optical imaging instrument here not covering the whole of the localisation sight 31, the part of the localisation sight 31 which is imaged by the optical imaging instrument 322 is (see FIG. 1) for example delimited by the black circle.

To determine the position and the orientation of the imaging instrument with respect to the localisation sight, the system for processing images analyses the image of the part of the localisation sight acquired by the optical imaging instrument. The image processing system utilises the image acquired to identify an elementary cell and extract from it, specific information coded in the different sub-cells of an elementary cell 310 of the localisation sight 31.

More specifically, the image of a part of the localisation sight 31 is analysed by conventional techniques for recognising shapes, so as to identify at least one and preferably more orientation patterns present in the image. The image processing system deduces from it the orientation of the orientation pattern(s) with respect to the two axes 161 and 162 of the imaging instrument. With the orientation of the orientation pattern(s) with respect to the axis 11X and 11Y of the sight being known, the means for analysing images thus determine the orientation of the two axes 161 and 162 of the imaging instrument with respect to the two axes 11X, 11Y of the localisation sight 31. In the case represented in FIG. 1, this relative orientation can be, for example, simply quantified by measuring the angle oriented between the axis 161 and the axis 11X.

Similarly, the image processing system determines the position of a point 160 of the optical imaging instrument with respect to the marker (O, 11X, 11Y) of the localisation sight 31. For this, the image processing system identifies, in particular, the central elementary cell 310F containing the image centre 160. The image processing system decodes the positioning pattern of the central elementary cell 310F in order to determine a first positioning of the image centre 160 with respect to the localisation sight 31. For example, the image processing system identifies, by shape recognition, the positioning pattern of the central elementary cell 310F and deduces from it the value of the first binary number coding the position of the central elementary cell 310F along the axis 11X and the value of the second binary number coding the position of the central elementary cell 310F along the axis 11Y.

The image analysis means thus determine a second positioning of the image centre 322 with respect to the localisation sight 31. This second positioning, more accurate, is achieved by means of the sub-cell(s) including the periodic check pattern of the central elementary cell 310F.

Indeed, by conventional image processing techniques, the image processing system makes it possible to determine a sub-pixel positioning of the sub-cells with a periodic pattern, i.e. for example, the position of each of these sub-cells is determined with an accuracy better than $3/100$ths of a pixel. For this, the magnification of the imaging instrument is selected such that each square of the check patterns covers an area equal to around six to twelve pixels.

Thus, the periodic pattern of the sub-cells 310B, 310C makes it possible to improve the accuracy of the positioning of the image centre 160 in the marker (O, 11X, 11Y) of the localisation sight 31. Consequently, this periodic pattern makes it possible to improve the accuracy of the positioning of the imaging instrument with respect to the sample 11.

Thus, the image processing system determines from the image, a part of the localisation sight 31:

- the orientation of the axis (161, 162) of the imaging instrument with respect to the axes (11X, 11Y) of the marker of the localisation sight 31 thanks to the identification of at least one orientation pattern of an elementary cell present in the image detected, and
- the position of a point 160 of the imaging instrument in the marker (O, 11X, 11Y) of the localisation sight 31 thanks to the reading of the positioning pattern of a central elementary cell 310F and to the sub-pixel positioning of the sub-cells of the central elementary cell 310F which include a periodic pattern.

A sight illustrated in FIG. 1, composed of a tiling of elementary cells such as schematised in FIG. 2, thus makes it possible to determine the position and the orientation at any point of the sample with respect to the reference point of the imaging instrument. When the measuring instrument is separate from the imaging system, all that is needed to be done, is to calibrate the transfer of coordinates between the measuring instrument and the imaging system to determine the position of the point measured by the measuring instrument.

However, it arises from the present disclosure, that a localisation sight of which the image is represented in FIG. 1, is not suitable for very different magnifications. Indeed, if the size of an elementary cell is not suitable for the magnification of imaging instrument, this imaging system is not capable of analysing the image to deduce from it the position and the orientation of the sight, because the patterns can either be too large, in which case the image of a complete elementary cell is not formed, or, on the contrary, too small, in which case the number of pixels of the detection system is insufficient to analyse the image of an elementary cell.

The present disclosure proposes a micro-localisation device for an imaging system making it possible to position, extremely accurately, a measuring instrument equipped with any imaging system, with respect to a sample.

FIG. 3 represents, on a macroscopic scale, a micro-localisation device 100 according to a first embodiment. Such a micro-localisation device is configured to be secured to the sample, to a sample stage or to a movement stage. The micro-localisation device 100 can be presented in the form of a self-adhesive sheet including a transparent or reflective substrate and at least one layer including micro-structured or nano-structured patterns.

This micro-localisation device is compatible with a plurality of scales of magnification of imaging systems. Particularly advantageously, this micro-localisation device is, for example, constituted of metal microstructures which could be imaged by different optical or particle beam or scanning probe imaging systems, so as to constitute a multimodal micro-localisation device.

In FIG. 3, an example of a micro-localisation device 100 has been represented. This micro-localisation device 100 is presented in the form of a generally flat object. The dimensions of this micro-localisation device 100 are, for example 4 mm×2 mm. The micro-localisation device 100 includes 8 zones. In this example, the zones numbered 1 to 8 all have the same square shape with 1 mm sides and one same surface area of 1 mm². The zones 1-8 here as arranged in lines and in columns, adjacent to one another. More specifically, each zone 1, respectively 2, 3, 5, 6, 7 filled with almost-periodic patterns is suitable for a different imaging system. Thus, the spatial period of the elementary cells is selected according to the magnification of the imaging system and of the field observed. On the one hand, the size of the elementary cells is such that at least one complete elementary cell is included in the field of observation of the imaging system. On the other hand, the patterns of this elementary cell are sufficiently large such that the imaging instrument and the image processing system can form and analyse the image from these elementary patterns.

Finally, the area of each zone 1-8 is sufficiently large to facilitate the pre-positioning of the observation and imaging system over the zone selected or at the interface between two zones or also at the junction point between a plurality of zones.

Particularly advantageously, the patterns have a contrast vis-à-vis different imaging system. Thus, a zone configured to be imaged through an optical microscope is advantageously constituted of reflective and non-reflective patterns in the optical radiation field. Moreover, another zone configured to be imaged through an atomic microscope is advantageously constituted of patterns having topographic steps. Finally, a zone configured to be imaged through a scanning electron microscope includes patterns having a significant contrast vis-à-vis electrons, while making it possible for charges to flow.

According to a specific embodiment, the micro-localisation device further includes one or more macroscopic marks making it possible for a pre-positioning through a large-field and low-magnification imaging system, completed for example by a system for processing images through shape recognition.

The micro-localisation device 100 is suitable to be fixed on a solid sample by gluing or to be secured to a sample stage or integrated to the sample stage, or to a microscope slide or strip or also secured to a translation stage of the sample stage. It is important that the micro-localisation device 100 remains rigidly secured to the sample to be observed for the whole time duration of use.

For example, the zones 1, 2, 3, 5, 6, 7 are filled by elementary cells such as described above, while the zones 4 and 8 are spatially uniform. Each zone 1, 2, 3, 5, 6, 7 is constituted of an elementary cell or of a tiling of a plurality of elementary cells. Inside one same zone, the elementary cells all have the same surface area and the same elementary pattern size, however the elementary cells of two adjacent zones have different dimensions in terms of surface area and of elementary pattern size.

Thus, in an embodiment, each zone 1, 2, 3, 5, 6, 7 includes elementary cells of different sizes, for example:

TABLE I

Example of dimensions and numbers of elementary cells associated with different zones of a micro-localisation device illustrated in FIG. 3, and measuring instruments suitable for each zone

| Zone number | Elementary area (microns²) | Number of elementary cells | Size of the smallest box (microns) | Corresponding instrument |
|---|---|---|---|---|
| 1 | 100 | 100 × 100 | 0.5 | AFM, SEM |
| 2 | 400 | 50 × 50 | 1 | Optical microscope 100X |

TABLE I-continued

Example of dimensions and numbers of elementary cells associated with different zones of a micro-localisation device illustrated in FIG. 3, and measuring instruments suitable for each zone

| Zone number | Elementary area (microns²) | Number of elementary cells | Size of the smallest box (microns) | Corresponding instrument |
|---|---|---|---|---|
| 3 | 1600 | 25 × 25 | 2 | Optical microscope 50X |
| 5 | 40000 | 5 × 5 | 10 | Optical microscope 10X |
| 6 | 250000 | 2 × 2 | 25 | Micro-FTIR |
| 7 | 1000000 | 1 | 50 | Macroscope |

In FIG. 3, the micro-localisation device 100 viewed in the entirety thereof with the naked eye or with a low-magnification optical imaging device is presented as an F-shape, and is therefore asymmetrical by construction. The top-left corner of the zone 1 is as the origin of the system of coordinates (O, 11X, 11Y) of this micro-localisation device 100.

More specifically, zone 1 includes, according to the example of table I, a tiling of 100×100 elementary cells 11 (see table I). Each elementary cell 11 is a square of size 10 microns×10 microns with an elementary area of 100 microns². The elementary cells 11 of zone 1 are arranged to form a compact tiling, preferably with 100 lines and 100 columns. FIG. 4A represents an elementary cell 11 including four sub-cells: the sub-cell 111 (at the top-left), the sub-cell 112 (at the top-right), the sub-cell 113 (at the bottom-left) and the sub-cell 114 (at the bottom-right). In the example represented in FIGS. 3 and 4A, zone 1 is square and each elementary cell 11 and each sub-cell are also of a square shape. The sub-cell 111 includes a position coding pattern 1112 and an orientation pattern 1111, for example of a geometric or alphanumeric shape, here, inverted L-shaped. The sub-cell 114 includes an identification pattern. The sub-cells 112 and 113 include the same periodic pattern 110 constituted of a check pattern of black boxes 1101 and of white boxes 1102. Here, the black and white elementary boxes, of same dimensions, are arranged in a check pattern, each elementary box 1101, 1102 being a square of 0.5 micrometres (or microns) on the side along each of the axes 11X and 11Y. The tiling of 10×10 elementary cells 11 thus formed covers the whole of the area of zone 1, i.e. a total area of 1 mm×1 mm. As indicated in table I, this zone 1 is particularly suitable for analysis by a scanning probe microscope, for example of atomic force microscope or AFM type, or by a scanning electron microscope or SEM, which are suitable for forming the image of an elementary cell with 10 micron sides, while spatially resolving the periodic pattern 110 with a minimum size of 0.5 microns.

As described above, zone 1 thus makes it possible for the positioning and the orientation of an atomic force microscope or a scanning electron microscope with a positioning accuracy of around one nanometre in the system of coordinates (O, 11X, 11Y).

Zone 2 is adjacent to zone 1 and is situated by construction in the same system of coordinates as zone 1. Zone 2 includes, according to the example of table I, a tiling of 50×50 elementary cells (see table I). Each elementary cell of zone 2 is a square of size 20 microns×20 microns, with an elementary area of 400 microns². The elementary cells 21, 22, 23, 24 of zone 2 are arranged to form a compact tiling, preferably with 20 lines and 20 columns. FIG. 4B represents an example of tiling of four elementary cells 21, 22, 23, 24. Similarly to the cell 11 of FIG. 4A, each elementary cell 21, 22, 23, 24 includes four sub-cells. In this example represented, zone 2 is square and each cell and sub-cell is also of a square shape. The elementary cell 21, respectively 22, 23, 24 includes a position coding pattern 2112, respectively 2212, 2312, 2412. Each elementary cell 21, 22, 23, 24 includes one same orientation patterns 2111, here, L-shaped. Each elementary cell 21, 22, 23, 24 includes an identification pattern 214, 224, 234 and 244. Advantageously, the identification patterns 214, 224, 234 and 244 are identical for all the elementary cells 21, 22, 23, 24 of the same zone 2. Preferably, the identification pattern is different from one zone to another zone of same device 100. Alternatively, the identification patterns can be identical for all the zones of one same micro-localisation device 100. The identification of each zone can, in this case, be encoded in the position pattern of each elementary cell.

Each elementary cell 21, 22, 23, 24 also includes a second periodic pattern 210 constituted of a check pattern of black boxes and white boxes. Here, each periodic pattern 210 includes black and white boxes of the same size, each black or white box being a square with 1 micron sides. The periodic pattern 210 here is also a periodic patterns along each of the axes 11X and 11Y, with a spatial period of 2 microns. The tiling of 50×50 elementary cells thus formed covers the whole area of zone 2, i.e. a total area of 1 mm×1 mm. This zone 2 is particularly suitable, as indicated in table I, for analysis by an optical microscope with a magnification of 100×, which is suitable for forming the image of an elementary cell with 20 micron sides, while spatially resolving the periodic pattern 110 with a minimum size of 1 micron.

Thus, zone 2 thus makes it possible for the positioning and the orientation of an optical microscope with a magnification of 100× with a sub-micrometric positioning accuracy in the system of coordinates (O, 11X, 11Y).

Similarly, zone 3, respectively zone 5 and zone 6, is constituted of a tiling of 25×25, respectively 5×5 and 2×2 elementary cells. Each elementary cell of zone 3, respectively zone 5 and zone 6, has a size of 40 microns×40 microns, respectively of 200 microns×200 microns and of 500 microns×500 microns. Each elementary cell of zone 3, respectively zone 5 and zone 6, has an area of 1600 microns², respectively of 40000 microns² and of 250000 microns². The tiling of elementary cells covers the whole area of zone 3, respectively zone 5 and zone 6, i.e. a total area of 1 mm×1 mm. The elementary cells of zone 3, zone 5 and zone 6 are formed similarly to the elementary cells of zone 1 or zone 2 described above. All the cells of zone 3, zone 5 and zone 6 include a position pattern, an orientation pattern, an identification pattern and a periodic pattern. The periodic pattern of the elementary cells of zone 3, zone 5 and zone 6, here is also a periodic pattern along each of the axes 11X and 11Y. The spatial period of the periodic pattern of zone 3 is 4 microns, each black or white box being a square with 2 micrometre sides. The periodic pattern of zone 5 has a spatial period of 20 microns, each black or white box being a square with 10 micrometre sides. The periodic pattern of the elementary cells of zone 6 has a spatial period of 50 microns, each black or white box being a square with 25 micrometre sides.

Zone 3 is particularly suitable, as indicated in table I, for analysis by an optical microscope with a magnification of 50×, which is suitable for forming the image of an elementary cell with 40 micron sides, while spatially resolving the periodic pattern of which the boxes have a size of 2 microns. Thus, zone 3 makes it possible for the positioning and the orientation of an optical microscope with a magnification of 50× with a micrometric or sub-micrometric positioning accuracy in the system of coordinates (O, 11X, 11Y).

Zone 5 is particularly suitable for analysis by an optical microscope with a magnification of 10×, which is suitable for forming the image of an elementary cell with 200 micron sides, while spatially resolving the periodic pattern of which the boxes have a size of 10 microns. Thus, zone 5 makes it possible for the positioning and the orientation of an optical microscope with a magnification of 10× with a micrometric or sub-micrometric positioning accuracy in the system of coordinates (O, 11X, 11Y).

Zone 6 is particularly suitable for analysis by an infrared micro-spectrometry apparatus, or micro-FTIR, which is suitable for analysing an elementary cell with 500 micron sides, while spatially resolving the periodic pattern of which the boxes have a size of 25 microns. Thus, zone 6 makes it possible for the positioning and the orientation of an infrared micro-spectrometer with a micrometric positioning accuracy in the system of coordinates (O, 11X, 11Y).

Zone 7 includes, for example, one single elementary cell with a size of 1000 microns×1000 microns and an area of 1 mm². The elementary cell of zone 7 includes a position pattern, an orientation pattern, an identification pattern and a periodic pattern. The periodic pattern of the elementary cell of zone 7 here is also a periodic pattern along each of the axes 11X and 11Y, with a spatial period of 100 microns, each black or white box being a square with 50 micrometre sides. Zone 7 is particularly suitable for analysis by a macroscope type apparatus which is suitable for analysing an elementary cell with 1 mm sides, while spatially resolving the periodic pattern of which the boxes have a size of 50 microns. Thus, zone 7 makes it possible for the positioning and the orientation of an infrared micro-spectrometer with a positioning accuracy of around ten microns in the system of coordinates (O, 11X, 11Y).

The micro-localisation device 100 constituted of zones 1, 2, 3, 5, 6, 7 thus forms a multiscale localisation device relating to one single and same system of coordinates (O, 11X, 11Y) while being very compact. The micro-localisation device 100 offers a great dynamic of scale of positioning and makes it possible for a positioning accuracy in a range extending from a sub-millimetric accuracy to a nanometric accuracy. The micro-localisation device 100 makes it possible for a positioning by means of imaging systems with a magnification which could vary by a plurality of orders of magnitude.

Figures 5, 6A, 6B, 7, 8:
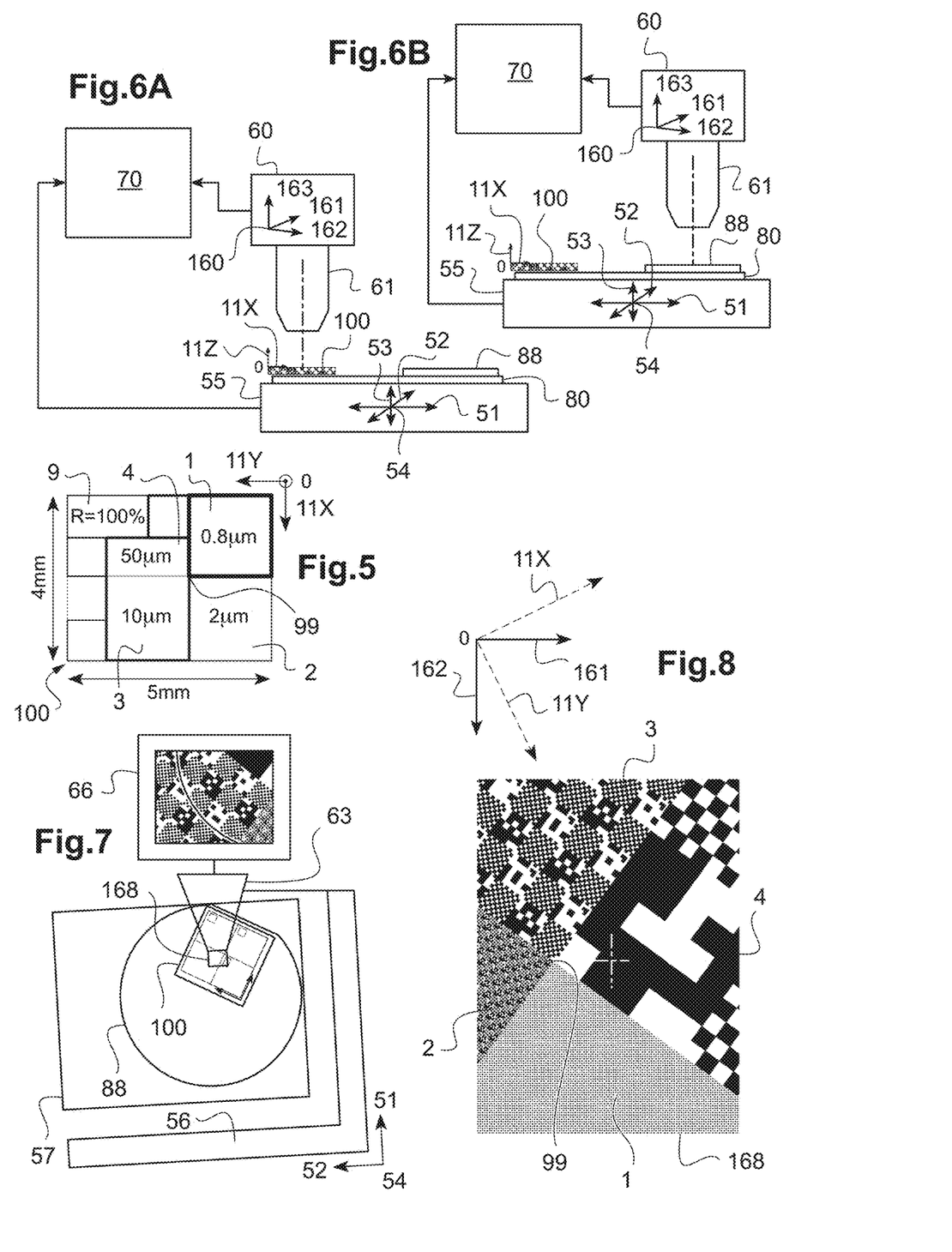

FIG. 5 illustrates another example of a micro-localisation device 100. In FIG. 5, the micro-localisation device 100 includes four micro-structured zones 1, 2, 3, 4, and another uniform zone 9. Zone 9 is preferably a metal zone with an optical reflection coefficient close to 100%.

It is observed that zones 1, 2 and 3 are of a square shape and of the same area (2 mm×2 mm). Zone 4 is L-shaped, formed of three sub-cells of 1 mm×1 mm and extends over an area of 3 mm². This zone 4 also includes a position pattern, an orientation pattern and a periodic pattern. The micro-localisation device 100 occupies a rectangular area of 4 mm wide and 5 mm long. The four zones are adjacent around a junction point 99.

Table II summarises the main characteristics of each zone 1, 2, 3, 4.

TABLE II other example of micro-localisation device illustrated in FIG. 5

| Zone number | Elementary area (microns$^2$) | Number of elementary cells | Size of the smallest box (microns) |
|---|---|---|---|
| 1 | 256 | 125 × 125 | 0.8 |
| 2 | 1600 | 50 × 50 | 2 |
| 3 | 40000 | 10 × 10 | 10 |
| 4 | 1000000 | 3 | 50 |

The user can arrange this micro-localisation device 100 on a sample or on a sample stage, for example by gluing or moulding outside of the zone of interest to be analysed on the sample. With an imaging instrument, the user searches for zone of the micro-localisation device 100 wherein the magnification of the instrument thereof makes it possible for an automatic reading of the patterns of the micro-localisation device 100, in particular, from the position thereof and from the orientation thereof.

FIG. 6A schematically represents a side view of a measuring apparatus including an imaging instrument 60, a sample stage 80, a movement stage 55 and a control unit 70. A sample 88 is arranged on a sample stage 80. A micro-localisation device 100 here is fixed on the sample stage 80 outside of the sample 88, the imaging instrument 60 includes, for example, a microscope lens 61. In FIG. 6A, the sample stage is arranged such that the imaging instrument 60 forms an image of the micro-localisation device 100. The control unit 70 makes it possible to deduce from this image, a transfer function between the system of spatial coordinates (O, 11X, 11Y, 11Z) of the micro-localisation device 100 and the orthonormal marker (160, 161, 162, 163) of the imaging instrument 60. Preferably, the control unit 70 controls at a translation stage 55, one or more small movements of the sample stage, while preserving the micro-localisation device 100 in the field of view of the imaging instrument 60. One or more images are acquired from the micro-localisation device following this/these movement(s) of the sample stage. Knowing the direction and the amplitude of the movement made, the processing system makes it possible to deduce from it, a transfer function between the system of coordinates connected to the axes of translation (54, 51, 52, 53) of the translation stage 55 and the system of spatial coordinates (O, 11X, 11Y, 11Z) of the micro-localisation device 100.

In FIG. 6B, the control unit 70 controls at the translation stage 55, a movement of the sample stage such that the sample 88 to be measured is located in the field of view of the imaging instrument 60. One or more images of the sample are acquired. Knowing the transfer functions between the respective systems of coordinates of the imaging instrument, of the stage and of the micro-localisation device, the processing system thus makes it possible to determine, very accurately, the position of the imaging instrument on the sample with respect to the system of spatial coordinates (O, 11X, 11Y, 11Z) of the micro-localisation device 100.

FIG. 7 schematically represents, as a top view, the apparatus of FIG. 6A and furthermore makes a screen for viewing 66 the imaging instrument 60 appear. The movement stage 55 includes a mobile carriage 57 and a stand 56 which is secured to the imaging instrument 60. The carriage 57 makes it possible to move the sample stage 80 relative to the imaging instrument 60. The carriage is, for example, mounted so that it can be moved in translation along the axes of an orthonormal marker (54, 51, 52, 53). The carriage is preferably motorised and includes position sensors in the orthonormal marker (54, 51, 52, 53). The motorised carriage 57 is controlled by a control unit 70 which also receives information from the position sensors.

The sample 88 is arranged on the carriage 57. A micro-localisation device here is fixed on the sample. The imaging instrument 60 forms an image of the field of view 168. This image appears on the viewing screen 66.

The movements of the carriage 57 are marked in the system of coordinates of the stage along the three transverse axes 51, 52, 53. However, the values marked can include errors coming from the accuracy of the sensors and from the mechanical design of the movement system. As indicated above, the micro-localisation device 100 includes its own system of coordinates (O, 11X, 11Y, 11Z). Finally, the control unit 70 receives the measurements acquired by the imaging instrument 60. It also includes an image processing system to process images from the micro-localisation device 100.

A first position measurement is taken of a first point of the micro-localisation device, then a movement of a predetermined quantity is applied to the carriage and a second position measurement is taken of a second point of the micro-localisation device.

From these measurements, the control unit 70 firstly makes it possible to calibrate the matrix of transfer between the orthonormal marker (160, 161, 162, 163) of the imaging instrument and the system of coordinates (O, 11X, 11Y, 11Z) of the micro-localisation device 100. Secondly, the control unit 70 makes it possible to calibrate the matrix of transfer between the orthonormal marker (54, 51, 52, 53) of the stage 55 and the system of coordinates (O, 11X, 11Y, 11Z) of the micro-localisation device 100. The control unit 70 thus makes it possible to obtain measurements, for example from microscopy or from micro-spectrometry, according to a relative movement between the carriage 57 supporting the sample 88 and the imaging instrument 60, these measurements being marked absolutely and extremely accurately in the marker of the micro-localisation device 100, which is connected to the sample 88.

The system represented in FIGS. 6A-6B makes it possible to obtain measurements from microscopy or from micro-spectrometry, marked very accurately in the system of coordinates (O, 11X, 11Y, 11Z) of the micro-localisation device. A person skilled in the art will adapt without any particular difficulty, the micro-localisation device to a beam-scanning microscopy or micro-spectrometry instrument with respect to a sample, to obtain images marked in a system of coordinates of a micro-localisation device connected to the sample.

In FIG. 8, an enlargement of the image of the micro-localisation device described in relation to FIG. 5 has been represented, seen through an imaging system or a measuring instrument such as represented in FIGS. 6A and 6B. The user pre-positions the centre 160 of the imaging instrument near the junction point 99 of the four zones 1, 2, 3, 4 of the micro-localisation device 100. The imaging instrument has a field of view 168 which here is rectangular. The accuracy of this pre-positioning is around 0.1 mm to 1 mm to make it possible to make the image of the junction point 99 in the field of view. The image thus captures at least one part of each of the four zones 1 to 4. However, it is observed that the field of view of the imaging instrument only captures one part of an elementary cell of zone 4. The image processing system does not make it possible to analyse the image of zone 4 of which the elementary cell is too large. On the other hand, the image of the elementary cells of zones 1 and 2 is too small and therefore too badly resolved and does not make it possible to distinguish the patterns of the elementary cells to make it possible to determine the position and the orientation of an elementary cell in these zones 1 and 2. However, the image of the elementary cell of zone 3 which is adjacent to the junction point 99 enters fully into the field of view of the imaging system and the image processing system perfectly resolves the periodic pattern of this elementary cell of zone 3. The image processing system is advantageously configured to automatically detect, for example by shape recognition, an elementary cell of zone 3 and to extract from it, the position and the orientation of the system of coordinates (160, 161, 162) of the imaging instrument with respect to the system of coordinates (O, 11X, 11Y) of the micro-localisation device 100.

After having marked the position of the junction point 99 in the marker of the imaging system, the user then makes a small movement of the carriage in the marker of the movement stage. They can, by means of the image processing system, accurately measure the movement induced on the image and this deduce from it, a matrix of transfer between the system of coordinates of the stage and the system of coordinates of the micro-localisation device 100.

The micro-localisation device 100 in particular has the following advantages, with respect to the devices of the prior art. Searching for the suitable zone in the micro-localisation device 100 is facilitated by the extent of the zone which is not limited to the size of the elementary cells suitable for the magnification of the imaging instrument. A pre-pointing for a sub-millimetric accuracy is enough to target the desired zone. The micro-localisation device 100 removes the accurate and laborious pre-pointing step of the systems of the prior art. The micro-localisation device 100 is multimodal, as it is suitable for very different measuring systems, such as an optical microscope or an electron microscope. The micro-localisation device 100 is multiscale. It is suitable for very different ranges of magnification. In addition, this micro-localisation device makes it possible to mark all the positions in a unique system of coordinates, which is possible because of the definition of the arrangement of different patterns, themselves codes by construction. Thanks to the periodic patterns, the micro-localisation device 100, offers a very broadly subpixel localisation accuracy. Indeed, when the periodic patterns fill around 50% of the image, it is possible to use subpixel localisation techniques which make it possible to mark the centre of the pattern with a localisation accuracy, better than $1/100^{th}$ of a pixel and thus exceed the resolution of the imaging instrument or of the imaging system. Furthermore, thanks to the periodic patterns, the micro-localisation device 100 makes it possible to determine the orientation of the sample with an accuracy better than $10^{-4}$ radians. The micro-localisation device 100 is not very bulky, and can be positioned closer to the zone of interest of a sample without obscuring the zone of interest. The micro-localisation device 100 makes it possible for an automatic reading by computer.

The micro-localisation device 100 of the present disclosure includes a system of coordinates, unique and common to all zones of one same micro-localisation device 100. The different zones are not simply juxtaposed, but each zone and each elementary cell is arranged in a known manner, very accurately. This configuration is essential for ensuring that the determination of the coordinates in the reference point of the micro-localisation device 100 is independent from the imaging instrument and from the magnification used. Indeed, operations of transferring coordinates require the initial knowledge of the arrangement of the zones 1, 2, 3, 4 in the micro-localisation device 100.

Observing the micro-localisation device 100 makes it possible to determine the position and the orientation of the imaging instrument used for the measurement in a system of coordinates. In addition, with the exact size of the periodic patterns being known, the micro-localisation device 100 also makes it possible to measure the field of view and the enlargement of the imaging instrument.

The user can easily calibrate the axes of a translation stage of the sample stage and/or of the measuring instrument, i.e. measure the orientation of the axes of translation with respect to the system of coordinates of the micro-localisation device 100. The user thus arranges a transfer of coordinates between the translation stage and the sample which makes it possible to move in a predetermined manner, on the sample. To this end, the user records, for example, two successive images of the micro-localisation device 100 by moving the translation stage along a known direction (for example, the axis X of the stage). From the positions of the micro-localisation device provided by analysing these images, the user and/or a piece of suitable software, deduces from it the sought orientation of the axis X.

Figure 9:
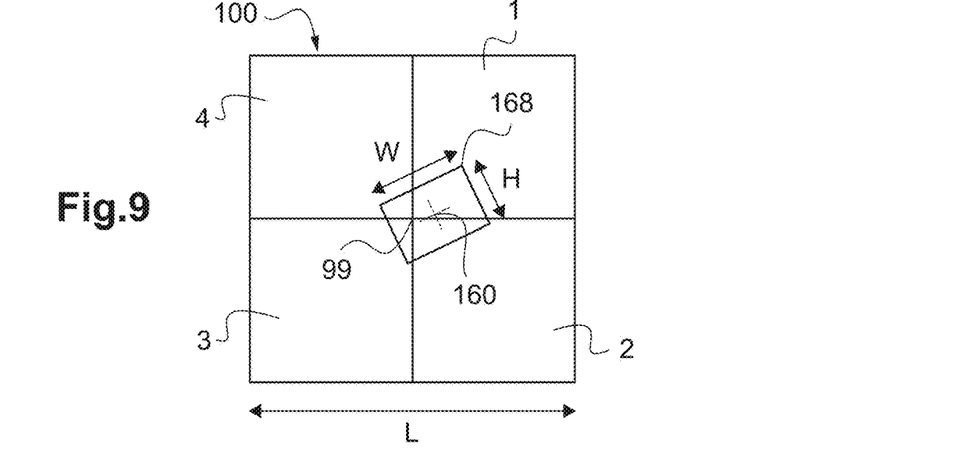
FIG. 9 represents a macroscopic view illustrating the positioning of the field of view of an imaging instrument on a micro-localisation device.

FIG. 9 illustrates the use of a micro-localisation device according to the present disclosure.

In FIG. 9, a micro-localisation device has been represented including four zones 1, 2, 3, 4 with micro-structured patterns and the junction point 99 thereof, such as, for example, described in relation to FIGS. 7 and 8. The area occupied by each zone extends to a macroscopic scale and the junction point is generally visible to the naked eye. The junction point 99 is advantageously situated at the centre of the micro-localisation device 100. An imaging instrument forms an image of a field of view 168, of dimensions H×W, where H and W are determined by the magnification of the imaging instrument. The imaging instrument includes, for example, a detector of the two-dimensional CCD camera or a two-dimensional beam scanning and point-by-point image reconstruction system. In this case, all that is needed, is that the centre 160 of the field of view 168 is pre-positioned on the zone with a suitable pattern size, of area (L/2)×(L/2), where L/2 is the length of the side of the zone with a suitable pattern size, on the condition that this is square. Indeed, in this case, there is always an elementary cell of a suitable size of the micro-localisation device in the field of view 168.

On the contrary, in a device including different alignment marks according to the prior art, it is necessary to pre-position each alignment mark in an area of H×W such that the alignment mark is located in the field of view of the imaging instrument. Yet, the more the imaging instrument has an increased magnification, the more reduced the field of view is, and the larger the difference between (L/2)×(L/2) and H×W is. The alignment mark devices of the prior art therefore generally require a longer duration to achieve the pre-positioning, the higher the magnification of the imaging instrument is.

Method

Figure 10:
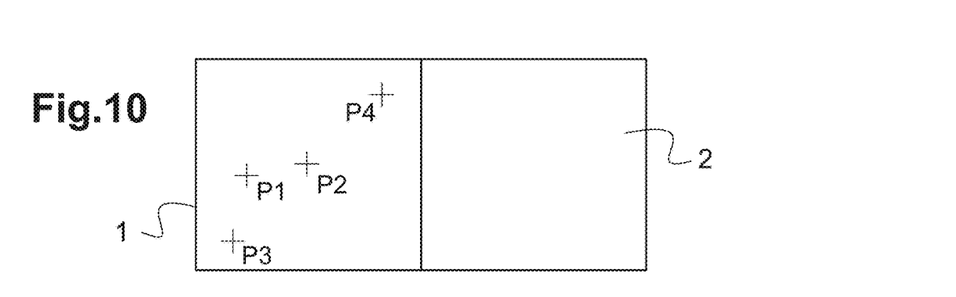
FIG. 10 illustrates the different trajectory points used for calibrating a system for moving the sample stage and/or scanning a measuring beam with respect to the system of coordinates of a micro-localisation device.

FIG. 10 illustrates a method for determining an observation position on a sample, from an imaging instrument equipped with a motorised movement stage and a multiscale micro-localisation device 100 such as described above.

The method includes the following steps;

a) securing the sample to be observed to at least one multiscale micro-localisation device 100;

b) placing the sample to be characterised in the imaging instrument at a first position P1, such that the imaging instrument produces an image of at least one zone of the micro-localisation device 100, the zone being suitable for the magnification of this instrument; recording the spatial coordinates (Xp1, Yp1) of the point P1 in the marker of the movement stage; acquiring a first image by means of the imaging instrument;

c) determining, from the analysis of the first image of said part of the micro-localisation device 100, the position and the orientation of said measuring instrument in the system of coordinates of the multiscale micro-localisation device 100; this position is marked by the spatial coordinates (Xm1, Ym1) expressed in the system of coordinates of the micro-localisation device 100 and by an angle ALPHA1 between the system of coordinates of the micro-localisation device 100 and an axis of the imaging instrument; determining, from the image analysis and from the knowledge of the size of the patterns observed, the magnification of the imaging instrument;

d) moving the sample, as well as the micro-localisation device which itself is secured, by means of a motorised and computerised movement stage, to a point P2 of coordinates (Xp2, Yp2) in the marker of the stage; checking that in this position, the imaging instrument is always in a zone of the sight of which the contrast and the magnification are suitable for the automatic reading of position, otherwise, moving to a suitable point P2; from the image analysis, determining the coordinates (Xm2, Ym2) marked in the system of coordinates of the micro-localisation device 100; from the measurements taken at steps c) and d), determining the formula for changing coordinates between the system of coordinates of the stage and the system of coordinates of the micro-localisation device 100;

e) moving the sample, as well as the micro-localisation device which itself is secured, by means of a motorised and computerised movement stage, to a localised measuring point P3 on the sample, marked by the coordinates (Xp3, Yp3) in the system of coordinates of the movement stage;

f) deducing, from the formula for changing coordinates defined in d), an absolute position (Xm3, Ym3) of the localised measuring point P3 in the system of coordinates of the micro-localisation device 100 connected to said sample, so as to determine a physical or chemical characteristic of the sample by said measuring instrument at said localised measuring point.

Step c) is a step of calibrating the imaging instrument. In this step c), the user places the suitable zone of the micro-localisation sight such that the imaging instrument forms an image of it, then deduces from it the orientation of the imaging instrument in the reference point of the sight and the enlargement of the imaging instrument.

Step d) is a step of calibrating the movement stage. The user makes a known movement of the whole sample and sight using the movement stage, which here is motorised and computerised, while keeping the sight in the field of the imaging instrument and forms a second image of the sight. The function of transfer is deduced from it, between the reference point of the sight and the reference point of the movement stage.

Step d) is a step of measuring a point of interest on the sample. The user makes a movement of the whole sample and sight using the movement stage and positions the sample such that the imaging instrument takes measurements on the sample. The computerised movement stage provides the coordinates of a point of interest on the sample in the reference point of the stage, the user deduces from it, for changing reference point, the absolute coordinates of the point of interest in the reference point of the sight.

FIG. 10 also illustrates a variant of the method for determining an observation position on a sample.

Through experiments, it has been observed that the inaccuracy of the knowledge of the movement of the stages could be a factor limiting the operational accuracy. Also, after having applied the method described in relation to FIG. 10, it is proposed to increase the accuracy by moving the stage in order to make the imaging instrument point towards different points P1, P2, P3, P4 of the micro-localisation device 100 and to take measurements of additional positions.

FIG. 10 represents the initial trajectory P1, P2, then an optimised trajectory P3-P4 taken in the diagonal of zone 1, so as to increase the distance between the points P3 and P4. It has been observed through experiments, that this method makes it possible to decrease the error of determining the angle between the axis of the stage and that of the sight. Advantageously, the trajectory P3-P4 is covered a plurality of times, in order to avoid effects of hysteresis of the stage and to decrease the noise of the measurements.

Figure 11:
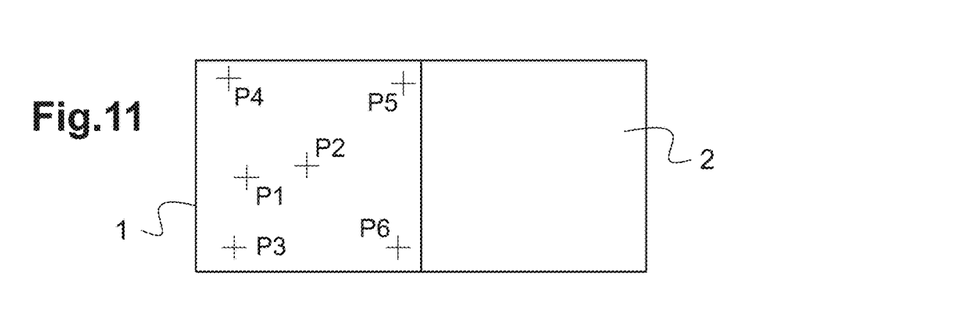
FIG. 11 illustrates the points of other trajectories used for calibrating a system for moving the sample stage and/or scanning a measuring beam with respect to the system of coordinates of a micro-localisation device.

FIG. 11 represents the initial trajectory P1, P2, then an optimised trajectory P3-P4-P5-P6, which has the shape of a square comprised inside zone 1, while having the largest area possible. It has been observed through experiments, that such a path has the tendency to decrease errors internal to the stage.

Figure 12:
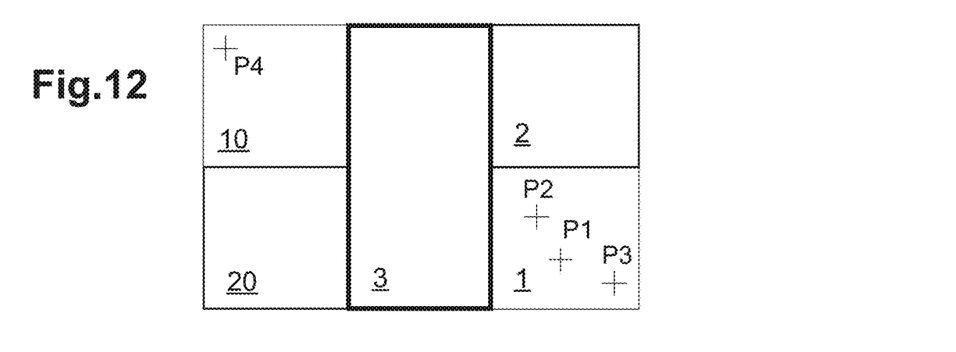
FIG. 12 represents a macroscopic view of another example of a micro-localisation device including separated zones assigned to the same spatial period and the different trajectory points used for calibrating a system for moving the sample stage and/or scanning a measuring beam.

FIG. 12 represents a micro-localisation device 100 with two separated zones 1 and 10, assigned to the same first spatial period. The micro-localisation device 100 further includes two other separated zones 2 and 20, assigned to one same second spatial period, and a zone 3 assigned to a third spatial period. The position of a point P3 is defined in zone 1 and the position of a point P4 in zone 10 such that the distance between the points P3 and P4 is as large as possible. Such a micro-localisation device 100 makes it possible to achieve a trajectory P3-P4 of which the distance is close to the largest size of the micro-localisation device 100, which is favourable to the accuracy regarding angles.

Absolute Repositioning Method

Figure 13:
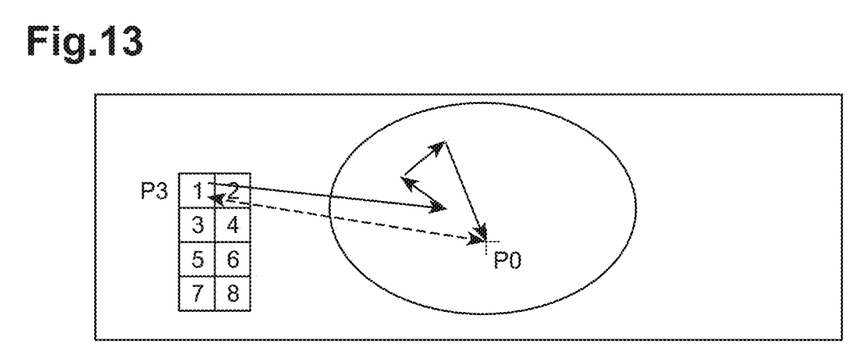
FIG. 13 illustrates a method for calibrating and positioning on a sample, by using a micro-localisation device.

FIG. 13 illustrates an example of a repositioning method.

An initial position P3 is determined in a zone 1 of a micro-localisation device 100, according to the method described above. Then, a series of movements are made, represented by the arrows in FIG. 13, for example, for taking measurements in different positions on the sample. Although the movements of the sample stage are accurately marked in the marker of the micro-localisation device 100, position errors can appear and accumulate, for example because of inaccuracies and mechanical clearance in the movements of the carriage of the movement stage. To check or correct the position of the point P0 on the sample, all that is needed, is for a movement in the direction of the initial position P3. Another accurate measurement of position is taken in zone 1, and if necessary, a position correction is applied in the marker of the micro-localisation device, which remains fixed with respect to the sample.

This adjustment device and method has applications, in particular in Raman microscopy. A micro-localisation device is advantageously permanently fixed on the sample stage.

Multiscale Method During a Change of Magnification of the Imaging Instrument

On optical microscopes or on Raman microscopes, it is common to change magnification by changing the microscope lens. The centre of the observation is generally not preserved, because lenses have a slightly different centring, typically several tens of microns and also, because the mechanical system for changing lenses has an accuracy and a repeatability which generally does not exceed 1 micron.

Also, a user who positions an observation zone around the point P0 that they deem useful at the centre 160 of the observation thereof, does not necessarily see this same zone when they change lenses to a greater magnification.

Figure 14:
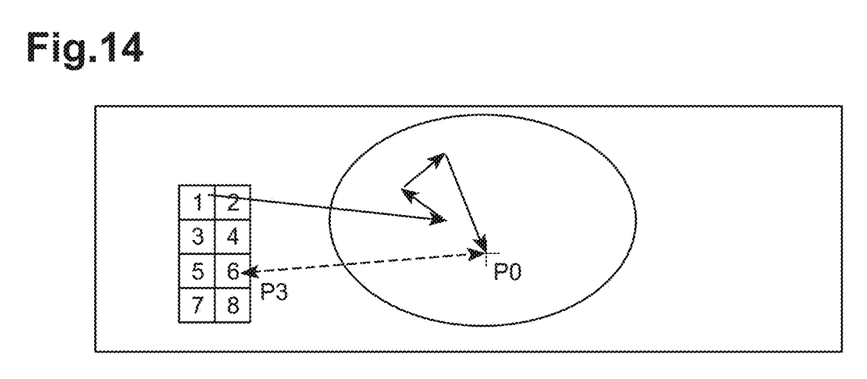
FIG. 14 illustrates another method for calibrating and positioning on a sample, by using a micro-localisation device.

To overcome this disadvantage, as soon as they have initialised the marking of the point P0 in a first observation session using the procedure described above, with respect to an initial point in zone 1, the user can change lenses and magnification, and start the following automatic procedure (see FIG. 14):

Giving the instruction to the stage to move the sample to bring a zone 6 of the multiscale micro-localisation device 100 into the observation zone, zone 6 being suitable for the new magnification. Because zone 6 in question is of a significant larger size than the few tens or hundreds of position-uncertain microns introduced by the new lens, it is always possible to aim for a zone, sufficiently distant from the edges, such that the imager observes the desired zone;

From the image obtained, determining the position of the point P3 of zone 6 in the marker of the micro-localisation device;

Deducing from it a difference in position between the two microscope lenses and to consequently adapt the formula for passing between the system of coordinates of the stage and the system of coordinates of the micro-localisation device. Possibly, the knowledge of the difference can be improved using additional movements and measurements in the same zone of the sight.

Giving the instruction to the stage to move the sample in order to bring the point P0 to the centre of the field of view of the imaging instrument, given the difference with respect to the centre of the zone imaged by the preceding microscope lens.

In this embodiment, it is understood how many specificities of the micro-localisation device of the present disclosure are important. Indeed, the zone suitable for an observation method is quite large and generally larger than the field of view of the instrument, such that a user is certain to be in a zone where the position can be read, despite the inaccuracy of knowledge of the position with the new microscope lens. In addition, the zones corresponding to the different observation methods and different magnifications are arranged against one another in a known manner in advance, and accurately localised in the unique reference point of the micro-localisation device.

A micro-localisation device permanently fixed to a microscopy apparatus makes it possible to control the adjustment of microscope lenses with different magnifications. Indeed, with the initial decentring between two lenses of one same apparatus being measurable by means of the micro-localisation device, it is possible to very accurately measure the decentring variations over time, in the marker of the micro-localisation device.

When the sample is of a significant size with respect to the micro-localisation device, for example a sample of more than 5 cm, while the sight measures 5 mm on the large side thereof, even minimal errors in determining the angle between the sight and the axis of the stage can be conveyed by positioning errors that are larger than acceptable errors. To decrease the orientation and position error, a plurality of sights can be selected to be placed on the sample to take measurements in the marker of the micro-localisation device closest to the measuring point.

Figure 15:
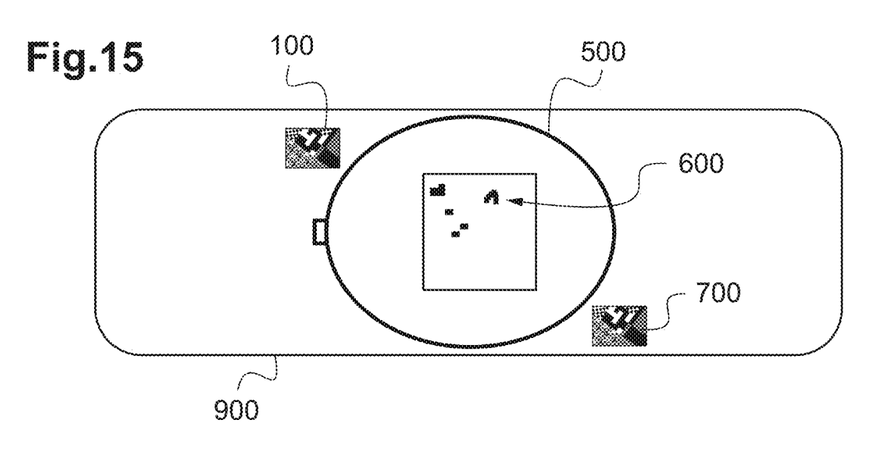
FIG. 15 represents a view of a sample stage, including a plurality of micro-localisation devices.

FIG. 15 illustrates a sample stage 900 on which are fixed a plurality, for example here, two, of micro-localisation devices 100, 700. This sample stage 900 includes, for example, a microscope slide on which are glued labels, each carrying a micro-localisation device 100, 700. On this sample stage, an insert 500 is placed, for example, made of polished stainless steel for a Raman microscope, or made of glass or quartz, or also a filter for another type of optical or particle beam or scanning probe microscope. The insert 500 can be temporarily fixed on the sample stage 900, by means of a glue, solid wax at ambient temperature and hot liquid or any other temporary fixing means.

Contrary to devices of the prior art, it is not necessary to arrange at least three positioning marks spread out from one another, and of which the positions are known accurately to form a marker. Each micro-localisation device 100, 700 here carries its own marker.

The calibration consists of carrying out operations of the method described above on one of the micro-localisation devices 100, then of being positioned above another micro-localisation device 700, in a zone suitable for the observation method: to deduce from it, using an image acquisition, the position of a point of the other sight 700 in the reference point of the stage, as well as the orientation thereof; possibly to repeat these operations in order to decrease the uncertainty of the measurements. Then, the resetting operations described above can be applied by going to be successively positioned on a plurality of micro-localisation devices.

The micro-localisation device is also suitable for co-localised observations using several instruments. To co-localise the observations with a plurality of instruments, the procedures indicated above are used for each instrument. Because the different zones of the micro-localisation device 100 have coordinates which are known in the unique and overall reference point of the micro-localisation device 100 assembly, independently from the zone where the measurement is taken, the coordinates determined in the plane of the micro-localisation device 100 are independent from the zone of which is used to determine the initial position.

For example, the matching of an atomic force microscope and an optical microscope can thus be achieved. Achieving the alignment of the two types of microscopes can be done, advantageously with a micro-localisation device 100 such as described above.

To accurately know the movements made by a stage, it is useful to have an item of information of a position sensor. Numerous stages have a position sensor. Alternatively, this item of information can be obtained by means of a micro-localisation device combined with an optical observation microscope. To this end, a zone suitable for an optical reading with the magnification considered of the optical microscope and extending over an area corresponding to the path of the movement stage is secured, either to the stage, or to the sample, the optical observation microscope being secured to the measuring instrument.

Certain instruments include a plurality of integrated observation methods. The micro-localisation device of the present disclosure makes it possible for the matching of a plurality of magnifications and/or methods by means of an imaging system.

For example, a Raman microscope can be configured to make it possible, on the one hand, for the full-field observation using a camera and lenses having different magnifications and, on the other hand, observation in confocal mode, obtained by scanning of a laser spot over the area of the sample. It is important to be able to match, very accurately, the measurements taken by the different operating methods of the apparatus (regarding centring, orientation, scale), in order to be able to superpose the images obtained in the different operating methods, without inducing differences in position and/or in orientation, likely to be damaging to analysing the images. In Raman microscopy, of which the spatial resolution can be as good as 200 nm, it is sought to match different operating methods better than 200 nm. Yet, it is difficult to determine, with such accuracy, the matching of the observations.

The method, to do this, is based on a micro-localisation device 100 such as described above, which has zones suitable for different operating methods and magnifications. Certain zones of the micro-localisation device 100 can be suitable for a plurality of operating methods.

For this, the steps of the matching method are as follows:

Positioning a micro-localisation device in a first position P1 so as to observe a suitable zone through an imaging system corresponding to a operating method and a magnification of the Raman microscope;

Acquiring the image in this operating method, deducing from it the coordinates (Xm1, Ym1) in the reference point of the micro-localisation device, the orientation of this operating method with respect to the micro-localisation device and the size of an elementary cell in the unit which is used to define the size of the image, for example in pixels;

Changing operating method; if the same zone of the micro-localisation device is suitable for a new operating method, acquiring an image and deducing from it the coordinates (Xm2, Ym2) in the reference point of the micro-localisation device, the orientation of this new operating method with respect to the micro-localisation device and the size of an elementary pattern in the unit which is used to define the size of the image;

The difference between the two operating methods of the imaging instrument is given by the vector P1P2, with the coordinates (Xm2−Xm1, Ym2−Ym1) in the reference point of the micro-localisation device. The orientation differences between the two operating methods are also determined, as well as the size of an elementary pattern for each method (for example, according to the size of a pixel of the camera for wide-field optical microscopy, or according to the scanning step in a scanning Raman micro-spectrometer).

In the case where, when operating method is changed, it is necessary to change the zone of the micro-localisation device, a movement of a known value is made, which given the knowledge of the initial position, brings the suitable zone of the micro-localisation device into the observation field. This movement vector is referenced V. A new image from another zone of the micro-localisation device is acquired, and the new position P2 of the micro-localisation device is deduced from it, the orientation therefore with respect to the imaging instrument and the size of an elementary cell in the unit which is used to define the size of the image. The difference between the two operating methods is thus given by the vector P1P2−V. The ratio of the magnifications is equal to the ratio of the sizes of the elementary cells, in the units which define the size of the image, divided by the ratio of the actual sizes of the elementary cells.

If needed, the correspondence between the coordinates of the vector V in the reference point of the movement stage (Vxp, Vyp) and in that of the micro-localisation device (Vxm, Vym) can be determined by making, for example from the position P1, a known movement (Xp0, Yp0) of the movement stage which keeps the observation field in the same zone of the micro-localisation device, and by determining the coordinates (Xm3, Ym3) of the new position P3 in the reference point of the micro-localisation device. The formula for transforming coordinates is obtained from Xm1, Ym1, Xm3, Ym3, Xp0, Yp0.

In order to regularly and automatically achieve resetting between a plurality of operating methods and/or magnifications, here it is considered to secure the micro-localisation device to the sample stage of the microscope, preferably on an edge or a corner of the zone that the stage makes it possible to bring into the observation zone. An advantage of the micro-localisation device according to the present disclosure compared with macroscopic alignment marking devices is that the imaging system is accommodated with an inaccurate pre-positioning.

As an example, a micro-localisation device produced on a silicon substrate and including a zone with 2 mm sides having metal patterns, for example made of gold or made of chrome, with a thickness of between 20 nm and 150 nm, of which the periodic pattern spatial half-period is 2 microns and the elementary cell has sides of 40 microns, is suitable for the calibration of both the imaging system with a 100× lens and the Raman observation. Another zone with 2 mm sides, having patterns of the same type, of which the periodic pattern spatial half-period is 10 microns and the elementary cell has sides of 200 microns, makes it possible to match a 10× lens of the same microscope with the 100× operating method.

The invention claimed is:

1. Micro-localisation device (100) for imaging instrument (60, 61), the micro-localisation device (100) defining a system of spatial coordinates (O, 11X, 11Y) and being suitable to be secured to a sample or to a sample stage, wherein:

the micro-localisation device (100) includes at least one first zone (1) and one second zone (2), adjacent to each other, said first, respectively second zone (1, 2) extending spatially over a first, respectively second, area of macroscopic dimensions, said first, respectively second, zone (1, 2) with a predetermined position and a predetermined orientation in the system of spatial coordinates (O, 11X, 11Y) of the micro-localisation device, said first, respectively second, zone (1, 2) including an elementary cell (11) or a tiling of a plurality of elementary cells (21, 22, 23, 24) extending over the first, respectively second, area of said first, respectively second, zone (1, 2), each elementary cell (11) of the first zone (1) extending over a first elementary area, each elementary cell (21, 22, 23, 24) of the second zone (2) extending over a second elementary area, different from the first elementary area, the first, respectively second, elementary area extending into a size range going from sub-millimetric to macroscopic, each elementary cell (11) of the first zone (1) including a first periodic spatial pattern (110) associated with a first spatial period function of the first elementary area, and, respectively, each elementary cell (21, 22, 23, 24) of the second zone (2) including a second periodic spatial pattern (210) associated with a second spatial period, different from the first spatial period, function of the second elementary area, each elementary cell (11, 21, 22, 23, 24) of said first zone (1) and, respectively second zone (2), further including an orientation pattern (1111, 2111) and a positioning pattern (1112, 2112, 2212, 2312, 2412) in the system of spatial coordinates (O, 11X, 11Y) of the micro-localisation device, at least one of said first or second elementary cells being suitable such that said imaging instrument (60, 61)

forms an image thereof and deduces from it a position, respectively, an orientation of said image in the system of spatial coordinates of the micro-localisation device (100).

2. Micro-localisation device (100) according to claim 1, wherein the first spatial period is greater than or equal to double the second spatial period.

3. Micro-localisation device (100) according to claim 1, wherein the first periodic spatial pattern (110) covers at least fifty percent of the area of each elementary cell (11) of the first zone (1), and/or, respectively, the second periodic spatial pattern (210) covers at least fifty percent of the area of each elementary cell (21, 22, 23, 24) of the second zone (2).

4. Micro-localisation device (100) according to claim 1, wherein the first periodic spatial pattern (110) is periodic along two transverse directions with the same first spatial period and/or wherein the second periodic spatial pattern (210) is periodic along two transverse directions with the same second spatial period.

5. Micro-localisation device (100) according to claim 1, wherein the orientation pattern, the positioning pattern and the periodic spatial pattern are formed by depositing and/or engraving a thin, metal layer.

6. Micro-localisation device (100) according to claim 1, wherein each elementary cell is of polygonal shape with sides of length equal to a whole number multiple of between one unit and a few tens of the spatial period of the periodic spatial pattern of said elementary cell.

7. Micro-localisation device (100) according to claim 1, further including at least one zone separated (10) from the first zone (1), each elementary cell (11) of the separated zone (10) including the same first periodic spatial pattern (110) associated with the same first spatial period.

8. Micro-localisation device (100) according to claim 1, including a plurality of zones (1, 2, 3, 4, 5, 6, 7, 8) arranged so as to form a micro-localisation device (100) of asymmetrical shape on a macroscopic scale.

9. Micro-localisation device (100) according to claim 1, including a plurality of zones (1, 2, 3, 4), each zone (1, 2, 3, 4) of the plurality of zones (1, 2, 3, 4), extending spatially over an area of macroscopic size, each zone (1, 2, 3, 4) of the plurality of zones (1, 2, 3, 4) including an elementary cell (11) or a tiling of a plurality of elementary cells (21, 22, 23, 24) extending over the respective area of said zone (1, 2, 3, 4), the zones (1, 2, 3, 4) of said plurality of zones (1, 2, 3, 4) being arranged around a junction point (99) common to an elementary cell (11, 21) of each of said zones (1, 2, 3, 4), each elementary cell of each of said zones (1, 2, 3, 4) around the junction point (99) being associated one-to-one, on the one hand, with an elementary area, and on the other hand, with a periodic spatial pattern (110, 210) function of the elementary area of said zone (1, 2, 3, 4).

10. Sample stage for microscopy apparatus including at least one micro-localisation device according to claim 1.

11. Measuring apparatus including an imaging instrument (60, 61), a sample stage (88, 900), a control unit (70) and at least one micro-localisation device (100, 700) according to claim 1, the micro-localisation device (100, 700) being secured to a sample or to the sample stage (88, 900), the imaging instrument (60, 61) being configured to acquire an image and the control unit (70) being configured to provide the coordinates of said image in the system of coordinates of the micro-localisation device (100, 700).

12. Measuring apparatus according to claim 11, further including a system for moving the sample stage integrating a device for measuring the movement of the sample stage in a system of coordinates of this movement system, the control unit (70) being configured to control a movement of the sample stage in the system of coordinates of the micro-localisation device (110).

13. Measuring apparatus according to claim 11, wherein the measuring apparatus includes a device for scanning an incident beam with respect to a sample, and wherein the control unit (70) is configured to control a movement by scanning of the incident beam and wherein the control unit (70) includes a system for processing the signal suitable for reconstructing an image point-by-point according to the scanning of the beam in the system of coordinates of the micro-localisation device (110).

14. Measuring apparatus according to claim 11, wherein the measuring apparatus includes a scanning probe microscopy apparatus with a tip and a system for moving said tip relatively to a sample to be analysed, wherein the control unit (70) includes a system for processing the signal suitable for reconstructing an image point-by-point according to the scanning movement of the scanning probe in the system of coordinates of the micro-localisation device (110).

15. Method for micro-localising (100) a sample including the following steps:
securing a micro-localisation device (100) according to claim 1 with a sample stage or a sample to be analysed so as to define a system of spatial coordinates connected to said sample,
arranging an imaging instrument so as to form an image of at least one elementary cell (11, 21, 22, 23, 24) of the micro-localisation device (100),
processing said image of at least one elementary cell (11, 21, 22, 23, 24), to deduce from it an orientation and a position of said image in the system of spatial coordinates of the micro-localisation device (100).

16. Micro-localisation device (100) according to claim 4, wherein the orientation pattern, the positioning pattern and the periodic spatial pattern are formed by depositing and/or engraving a thin, metal layer.

17. Micro-localisation device (100) according to claim 16, including a plurality of zones (1, 2, 3, 4, 5, 6, 7, 8) arranged so as to form a micro-localisation device (100) of asymmetrical shape on a macroscopic scale.

18. Micro-localisation device (100) according to claim 3, including a plurality of zones (1, 2, 3, 4), each zone (1, 2, 3, 4) of the plurality of zones (1, 2, 3, 4), extending spatially over an area of macroscopic size, each zone (1, 2, 3, 4) of the plurality of zones (1, 2, 3, 4) including an elementary cell (11) or a tiling of a plurality of elementary cells (21, 22, 23, 24) extending over the respective area of said zone (1, 2, 3, 4), the zones (1, 2, 3, 4) of said plurality of zones (1, 2, 3, 4) being arranged around a junction point (99) common to an elementary cell (11, 21) of each of said zones (1, 2, 3, 4), each elementary cell of each of said zones (1, 2, 3, 4) around the junction point (99) being associated one-to-one, on the one hand, with an elementary area, and on the other hand, with a periodic spatial pattern (110, 210) function of the elementary area of said zone (1, 2, 3, 4).

19. Micro-localisation device (100) according to claim 4, including a plurality of zones (1, 2, 3, 4), each zone (1, 2, 3, 4) of the plurality of zones (1, 2, 3, 4), extending spatially over an area of macroscopic size, each zone (1, 2, 3, 4) of the plurality of zones (1, 2, 3, 4) including an elementary cell (11) or a tiling of a plurality of elementary cells (21, 22, 23, 24) extending over the respective area of said zone (1, 2, 3, 4), the zones (1, 2, 3, 4) of said plurality of zones (1, 2, 3, 4) being arranged around a junction point (99) common to an elementary cell (11, 21) of each of said zones (1, 2, 3, 4), each elementary cell of each of said zones (1, 2, 3, 4) around the junction point (99) being associated one-to-one, on the one hand, with an elementary area, and on the other hand, with a periodic spatial pattern (110, 210) function of the elementary area of said zone (1, 2, 3, 4).

20. Micro-localisation device (100) according to claim 5, including a plurality of zones (1, 2, 3, 4), each zone (1, 2, 3, 4) of the plurality of zones (1, 2, 3, 4), extending spatially over an area of macroscopic size, each zone (1, 2, 3, 4) of the plurality of zones (1, 2, 3, 4) including an elementary cell (11) or a tiling of a plurality of elementary cells (21, 22, 23, 24) extending over the respective area of said zone (1, 2, 3, 4), the zones (1, 2, 3, 4) of said plurality of zones (1, 2, 3, 4) being arranged around a junction point (99) common to an elementary cell (11, 21) of each of said zones (1, 2, 3, 4), each elementary cell of each of said zones (1, 2, 3, 4) around the junction point (99) being associated one-to-one, on the one hand, with an elementary area, and on the other hand, with a periodic spatial pattern (110, 210) function of the elementary area of said zone (1, 2, 3, 4).

* * * * *